United States Patent [19]
Rio et al.

[11] 3,972,969

[45] Aug. 3, 1976

[54] MANUFACTURE OF CEMENT-RESIN COMPOSITE ARTICLES

[76] Inventors: Arturo Rio; Marcello Cerrone, both of Soc. Calci e Cementi di Segni Laboratorio Centrale, 00034 Colleferro (Rome); Alberto Saini, Via Tripoli, 143, 00199 Rome, all of Italy

[22] Filed: Aug. 24, 1973

[21] Appl. No.: 392,091

Related U.S. Application Data

[63] Continuation-in-part of Ser. No. 166,298, July 26, 1971, abandoned.

[30] Foreign Application Priority Data

Aug. 6, 1970   Italy.................... 52712/70
Aug. 8, 1970   Italy.................... 52749/70

[52] U.S. Cl.................... 264/42; 106/97; 264/82; 264/101; 264/129; 264/333; 264/DIG. 43
[51] Int. Cl.².................. C04B 7/02; C08H 17/00
[58] Field of Search............ 264/129, 101, 102, 43, 264/128, 333, DIG. 43, 82, 42; 117/61, 119, 148; 106/90, 97

[56] References Cited
UNITED STATES PATENTS

| | | | |
|---|---|---|---|
| 1,682,359 | 8/1928 | Straub............ | 264/DIG. 43 |
| 2,496,895 | 2/1950 | Staley.................. | 264/82 |
| 3,501,323 | 3/1970 | Moorehead............ | 106/97 |
| 3,553,005 | 1/1971 | Moragne............... | 117/119 |

*Primary Examiner*—Jeffery R. Thurlow
*Attorney, Agent, or Firm*—Young & Thompson

[57] ABSTRACT

Cement-resin composite articles are manufactured by preparing cement articles from Portland cement having a high silicic modulus, or a mixture of 50 to 90% by weight of Portland cement and 50 to 10% by weight of siliceous reactive material, presetting the cement articles at ambient temperature, steam curing the articles under pressure at a temperature from 150° to 250° C. for 1 to 6 hours, subjecting the steam cured articles to a thermal treatment in an anhydrous environment at a temperature of 120°–350°C. for 1 to 12 hours, impregnating the resulting articles with a monomeric polymerizable substance, and polymerizing the monomeric substance. The monomeric substance may be styrene, methylmethacrylate, vinyl ester, or a mixture of copolymerizable monomers. The articles may be placed under vacuum before impregnation and impregnation may be conducted under elevated pressure.

5 Claims, No Drawings

MANUFACTURE OF CEMENT-RESIN COMPOSITE ARTICLES

The present invention is a continuation-in-part of application Ser. No. 166,298, filed July 26, 1971 and now abandoned.

This invention relates to improvements in cement-resin composite articles. More particularly it relates to a process for manufacturing cement-resin composite articles of improved characteristics and to the articles thus obtained which show exceptionally high mechanical strength and resistance to abrasion and are practically watertight.

Cement conglomerates, although generally regarded as excellent building materials, show some limitations which are essentially related to their variations in volume connected with the temperature and humidity of the storage ambient, to their moderate tensile strength and also to some of their peculiar features such as their low resistance to chemical agents, to abrasion, to cavitation and finally, because of a certain degree of water permeability, to frost action.

Impregnation of green or prehardened cementitious articles with a polymerizable substance which is subsequently polymerized in situ is a technique that has rapidly developed in recent years.

The results achieved by means of this so-called "impregnation" technique indicate that it is possible to increase considerably the mechanical strength (e.g. compressive and tensile) and also substantially improve the abovementioned unfavorable characteristics.

Such improvement is essentially due to the fact that the filling with resin of the voids present in the conglomerate structure increases the compactness and strength of the article, making it thus possible to employ cement-resin composite articles also under difficult conditions which would prevent the use of a traditional cement conglomerate.

However, when the known impregnation technique is carried out with cement articles prepared and hardened in the conventional manner, one is confronted with a double drawback: (a) the limited impregnation degree with the monomeric substance, normally not exceeding 5–6% by weight and (b) the need to wait for the complete hardening of the conglomerate before impregnation thereof with the monomeric charge. In practice, impregnation is normally carried out after about 28 days.

The present invention has for its object the production of cement-resin articles obviating the above drawbacks by providing a process wherein the impregnation technique is carried out on cement articles specially prepared for this purpose, characterized by high microporosity and very high mechanical strength and which moreover can be prepared in greatly reduced periods of time.

In our above-identified copending application, a method has been described for preparing in very short times, even less than 12 hours, high mechanical strength cement articles. The method is characterized in that it comprises the following steps:

a. preparing, according to the conventional practice, cement articles from Portland cement having preferably a high siliceous modulus or from mixtures consisting substantially of from 50% to 90% by weight of Portland cement and from 50% to 10% by weight of siliceous reactive materials;

b. presetting the cement articles at ordinary temperature;

c. steam-curing the articles under high pressure at a temperature from 150° to 250°C. for 1 to 6 hours; and d. subjecting the steam-cured articles to a thermal treatment in anhydrous environment, at a temperature of 120° to 350°C. for a period of time of 1 to 12 hours.

The articles prepared according to this process show very high mechanical strength, definitely higher than that of conventionally prepared autoclaved conglomerates, reaching values of about 1500 kg/cm$^2$. Moreover, the articles show a remarkable degree of microporosity. Comparison measurements performed on conventional autoclaved conglomerates and on conglomerates obtained according to the above method, show for the latter not only a higher absolute porosity value but also a different distribution of the pores corresponding to a diffuse microposity. Thus, while the total porosity reaches values of the order of 10$^{-3}$ cm$^3$/g, the examination of the pores distribution shows a shifting of the curve towards the lower diameters.

Upon impregnation of such articles with a polymerizable substance, an impregnation degree of the order of 10–15% by weight can be obtained, i.e. approximately twice that obtainable with the previously known conglomerates. By subsequent polymerization in situ of the monomeric impregnating substance, carried out in the conventional manner, cement-resin composite articles are obtained with properties decidedly superior to those of previously known resin-cement articles.

Thus, the present invention resides in a method of producing improved cement-resin composite articles, comprising impregnating with a monomeric polymerizable substance a cement article prepared according to the process of our above-identified copending application, and subjecting thereafter the impregnated articles to conditions where polymerization in situ of the monomeric substance occurs.

Because of the particular characteristics of the starting articles, i.e. high degree of porosity and very high intrinsic mechanical strength, composite articles of exceptional mechanical and application properties are obtained, which show an extraordinary compactness and can display mechanical strength of the order of 2500 kg/cm$^2$.

In the choice of the monomeric substance to be used for the impregnation a number of factors have to be taken into account such as the cost of the monomer, its physical-chemical characteristics, its ability to polymerize and finally, the properties of the resulting polymer as related to the intended use of the composite article.

With regard to the physical-chemical properties, preference is given to liquid monomers with viscosities allowing an easy and rapid penetration into the microporous structure of the article and not requiring long polymerization times, in view of not affecting excessively the process economy.

With regard to the choice of the monomer in connection with the use of the composite material, the chemical inertness and the softening temperature of the polymer are assumed as stability indexes for the organic component within the structure.

Excellent results are obtained using, for instance, acrylic and methacrylic esters, vinylic esters, styrene, etc. Mixtures of copolymerizable monomers such as, for example, mixtures of styrene with methyl methacrylate, vinyl acetate, alpha-methyl-styrene, di-vinylbenzene, acrylonitrile, etc. can also be used. Gaseous monomers, such as ethylene, may be used if proper impregnation and polymerization techniques are followed.

In order to facilitate the polymerization process, suitable activators and/or promoters are preferably added to the monomeric charge.

In order to promote penetration of the monomer, thereby increasing the amount thereof inside the cement article, the article is advantageously placed before impregnation in an autoclave and maintained under vacuum until a residual pressure of a few Hg mm is reached. Subsequently, the imbibition operation is preferably carried out under a pressure of some dozens of atmospheres of nitrogen so as to reduce the impregnation time and to ensure a deep homogeneous penetration of the monomer into the interior of the structure.

By addition of dyeing agents to the monomeric charge, it is possible to ascertain the penetration degree thereof within the article, thus establishing the minimum operation time required according to the size and shape of the articles.

The manner of carrying out the invention in practice is described more in detail in the following examples in which the parts are by weight unless otherwise specified.

EXAMPLE 1

Concrete articles were prepared according to the conventional practice from:

binder consisting of a mixture of Portland cement with high silicic modulus (3.10) and low fluxing agents modulus (1.3) and of sand with high (90%) $SiO_2$ content, in the ratio 70:30;

basaltic inert materials granulometrically corresponding to the Füller curve (P = 100 $\sqrt{d/D}$) with a maximum diameter of the aggregate of 10 mm; wherein:

binder/inert materials ratio = 1.5
water/binder ratio = 0.50

After having been subjected to the following ageing conditions:

a. 12 hours at room temperature,
b. 3 hours in autoclave at 215°C. (20 atm.),
c. 4 hours anhydrous thermal treatment at atmospheric pressure at 200°C., the articles show a mechanical strength of 1.250 kg/cm² and a total porosity of 0.0625 cc/g.

These articles were then subjected to about 1 mm Hg of residual pressure and subsequently to impregnation by immersion under vacuum in methyl methacrylate containing suitable additions (0.1% dimethylaniline + 1% benzoylperoxide). A pressure of about 50 atm. was then applied to the autoclave for a rapid completion of the monomer penetration. The impregnated articles were then wrapped in aluminum foils in order to reduce evaporation losses during thermopolymerization and finally, they were thermally treated for 15 hours at 66°C.

The composite articles thus prepared show the following characteristics:

| | |
|---|---|
| a) impregnation degree | 11% by weight |
| b) mechanical compressive strength | 1.850 kg/cm² |
| c) water absorption | 0.15% by weight |
| d) abrasion (ASTM C4 18–68) | 2 g |

EXAMPLE 2

Mortar articles were prepared from A.R.C. pozzolana cement and sand standardized according to the Italian specifications, proportioned in the ratio 1:3 with a water/cement ratio = 0.50 and were then subjected to the following ageing conditions:

a. 12 hours at room temperature,
b. 3 hours in autoclave at 215°C. (20 atm.),
c. 4 hours anhydrous thermal treatment at atmospheric pressure at 200°/C.

At the end of said treatments the articles show the following characteristics:

| | |
|---|---|
| mechanical compressive strength | 1.356 kg/cm² |
| porosity | 0.085 cc/g |

The articles were subjected to impregnation and polymerization treatments as described in Example 1: The composite articles thus obtained show the following characteristics:

| | |
|---|---|
| a) impregnation degree | 12.5% by weight |
| b) mechanical compressive strength | 2.160 kg/cm² |
| c) water absorption | 0.10% by weight |
| d) abrasion (ASTM C 4 18–68) | 1.5 g |

EXAMPLE 3

Concrete articles were prepared from A.R.C. pozzolana cement and basaltic inert materials granulometrically corresponding to the Füller curve (P = 100 $\sqrt{d/D}$) with a maximum diameter of the aggregate of 10 mm, with a water/cement ratio = 0.5 and a binder/inert materials ratio = 0.2. After having been subjected to the same ageing conditions as described in Example 1, the articles show a mechanical strength of 1.260 kg/cm² and a porosity of 0.0752 cc/g.

After impregnation and polymerization in the manner described in Example 1 but using styrene as impregnating agent, the resulting composite articles show the following characteristics:

| | |
|---|---|
| a) impregnation degree | 9.9% by weight |
| b) mechanical compressive strength | 2,040 kg/cm² |
| c) water absorption | 0.21% by weight |
| d) abrasion (ASTM C 4 18–68) | 4.5 g |

EXAMPLE 4

Mortar articles were manufactured as in Example 2 using as a binder a mixture of Portland cement with high silicic modulus (3.10) and low fluxing agents modulus, and sand with a high (90%) $SiO_2$ content, in the proportion 70:30. After having been subjected to the same ageing conditions described in Example 2, the articles show a mechanical strength of 1.330 kg/cm² and a porosity of 0.085 cc/g.

These articles were then impregnated and subjected to polymerization in the manner described in Example 1 but using styrene as impregnating agent. The resulting composite articles show the following characteristics:

| | |
|---|---|
| a) impregnation degree | 10% by weight |
| b) mechanical compressive strength | 2.200 kg/cm² |
| c) water absorption | 0.02% by weight |

-continued d) abrasion (ASTM C 418-68)    4 g

After having described our invention, we claim:
1. A process for manufacturing cement articles having very high mechanical strength, comprising:
   a. forming articles of a desired shape from a member selected from the group consisting of mortar and concrete prepared from water and a member selected from the group consisting of Portland cement having a high silicic modulus, pozzolana cement and a mixture consisting of 50 to 90% by weight of Portland cement and 50 to 10% by weight of reactive siliceous material;
   b. pre-aging said articles at room temperature;
   c. steam-curing said articles in an autoclave at a temperature from 150° to 250°C. for 1 to 6 hours;
   d. maintaining the steam-cured articles in an anhydrous environment at a temperature from 120° to 350°C. for 1 to 12 hours, thereby to produce porous articles;
   e. impregnating said articles with a liquid monomeric polymerizable substance in an amount of the order of 10–15% by weight; and
   f. polymerizing said monomeric substance in situ.

2. A process as claimed in claim 1, in which said monomeric substance is selected from the group consisting of styrene, acrylic ester, methacrylic ester, vinyl esters and mixtures of copolymerizable monomers.

3. A process as claimed in claim 1, in which said articles are impregnated with a small amount of dimethylaniline and benzoylperoxide in admixture with said monomeric polymerizible substance.

4. A process as claimed in claim 3, in which said polymerization is effected by heating said articles to a temperature of about 66°C for about 15 hours.

5. A method as claimed in claim 1, in which said impregnation is effected by immersing the articles in said monomeric substance under vacuum and then applying superatmospheric pressure to the impregnated articles to augment the penetration of the polymerizable substance.

* * * * *